United States Patent

Dufour et al.

[15] 3,700,265

[45] Oct. 24, 1972

[54] INTERNAL PIPE SEALING DEVICE

[72] Inventors: Raymond J. Dufour, Wheaton, Ill.; James J. Grimm, Columbus, Ohio

[73] Assignee: Northern Illinois Gas Company, Aurora, Ill.

[22] Filed: Feb. 4, 1972

[21] Appl. No.: 223,596

Related U.S. Application Data

[62] Division of Ser. No. 35,140, May 6, 1970.

[52] U.S. Cl. .................. 285/15, 138/97, 285/346, 285/370
[51] Int. Cl. ............................................. F16l 55/00
[58] Field of Search ........ 285/15, 370, 397, 338, 346; 138/97; 29/401

[56] References Cited

UNITED STATES PATENTS

| | | | |
|---|---|---|---|
| 2,517,626 | 8/1950 | Berg | 138/97 |
| 3,199,598 | 8/1965 | Loomis | 138/97 X |
| 3,593,749 | 7/1971 | Reardon | 138/97 X |
| 3,586,056 | 6/1971 | Kipp | 138/97 X |
| 3,643,701 | 2/1972 | Wadiak et al. | 138/97 X |
| 2,214,177 | 9/1940 | Roybould | 285/370 |

*Primary Examiner*—Dave W. Arola
*Attorney*—John A. Dienner et al.

[57] ABSTRACT

The sealing device is composed of an inner expandable retainer member and an outer elastic sealing member. The inner retainer member in the unexpanded position has a cylindrical sleeve configuration with its end portions in an overlapping arrangement. One of these end portions has two locking grooves to accommodate a range of pipe diameters, which are adapted to receive and hold the other end. The outer elastic member has two annular spaced ridges formed of a deformable hard material which are urged against the pipe's interior by the inner retainer member to form an air-tight seal with the pipe.

7 Claims, 1 Drawing Figure

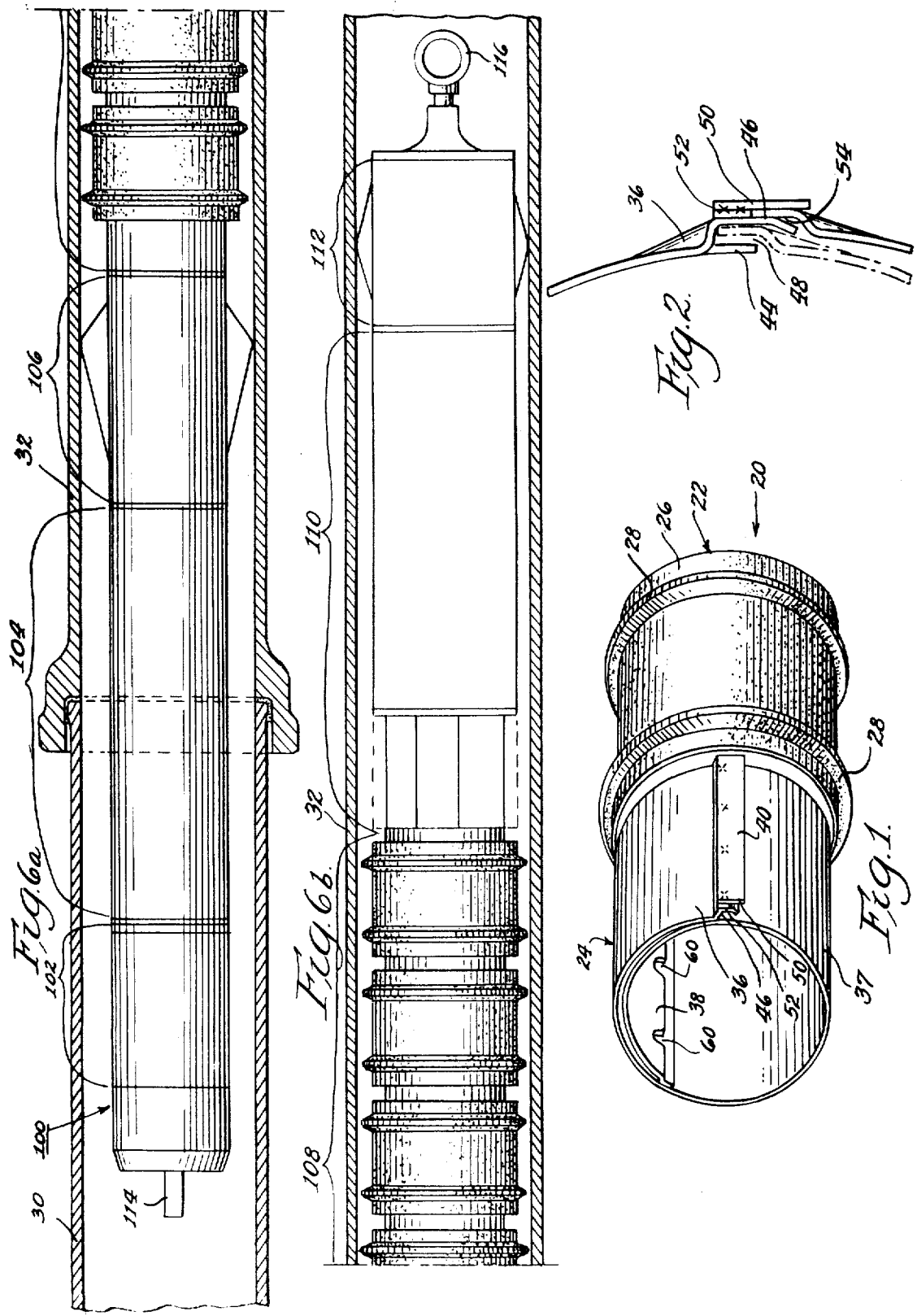

Patented Oct. 24, 1972
3,700,265
2 Sheets-Sheet 2
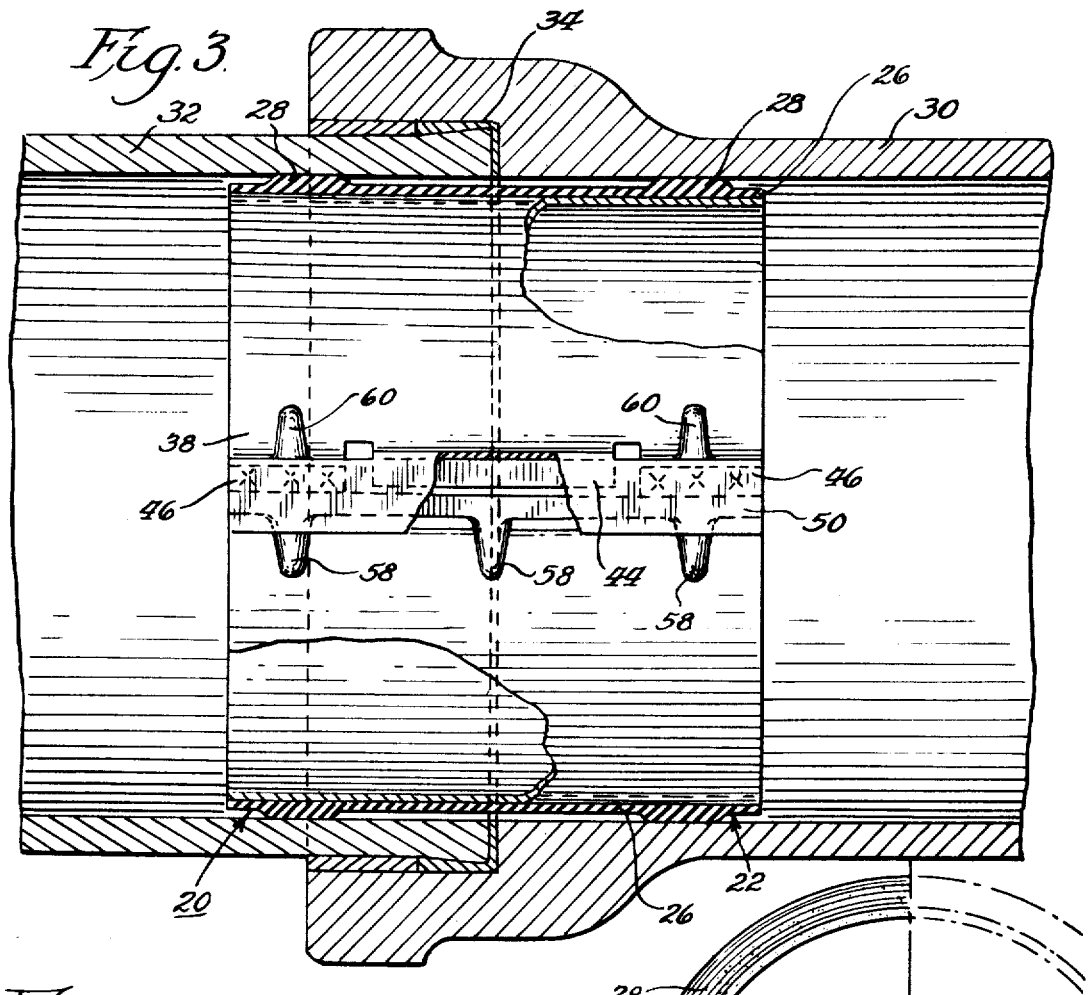
Fig. 3.
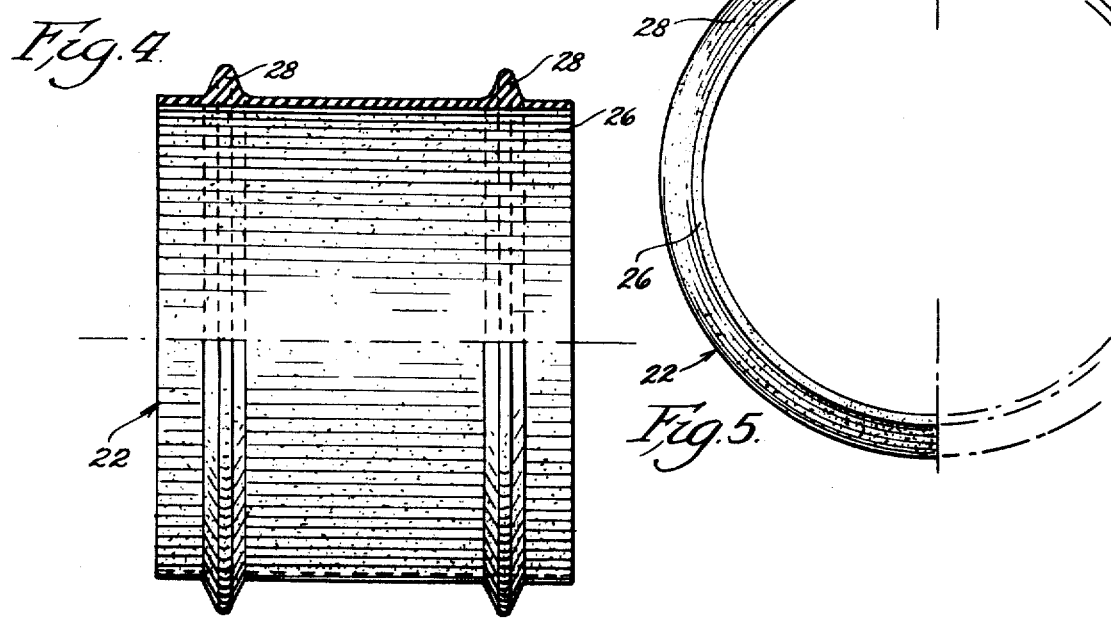
Fig. 4.
Fig. 5.

INTERNAL PIPE SEALING DEVICE

This is a divisional application of our copending application entitled "Internal Pipe Sealing Systems" and identified as U. S. Ser. No. 35,140, filed May 6, 1970.

BACKGROUND OF THE INVENTION

This invention relates to an apparatus for the sealing of pipes, and more particularly to the sealing of pipe joints, the invention being especially useful in the sealing of leaks in gas main systems.

Previous methods of repairing leaks in gas mains, or in treating joints in such pipes to prevent the development of leaks, has involved the expensive operation of excavating around each joint or leak in order to expose the pipe and applying a pipe joint clamp around the joint. Such procedures are extremely expensive in that the entire operation must be repeated at every joint.

In order to eliminate the necessity for excavation at each joint, this invention relates to an internal pipe joint sealing device which can be applied from the inside of gas mains including small internal-diameter pipes.

SUMMARY OF THE INVENTION

The sealing device of this invention comprises an inner retainer member and an outer elastic sealing member. The inner retainer member in the unexpanded position has a cylindrical sleeve configuration with its end portions in an overlapping arrangement. One of these end portions has locking means for engaging the end portion to accommodate different pipe diameter sizes. The outer elastic member includes two annular spaced ridges formed of a deformable hard material which provide means to form an air-tight seal with the pipe.

DESCRIPTION OF DRAWING

For a better understanding of this invention reference should be made to accompanying drawing, in which:

FIG. 1 is a perspective view of a sealing device with its inner retainer member removed from its outer sealing member;

FIG. 2 is an enlarged partial side view of the retainer member of FIG. 1, illustrating its two locking positions;

FIG. 3 is a sectional view of the sealing device shown in FIG. 1, illustrated in sealing engagement with a pipe joint;

FIG. 4 is a side view of the outer sealing member of FIG. 1;

FIG. 5 is an end view of FIG. 4; and

FIGS. 6a –6b form a combined side view of a seal installation tool carrying a plurality of sealing devices inside a section of a gas main.

DESCRIPTION OF PREFERRED EMBODIMENT

There is shown in FIG. 1, a sealing device 20 used to effect a bubble-tight seal for stopping a leak in a gas main. Since most leaks in gas mains occur between joints of adjoining pipe sections, the sealing device 20 is particularly designed to form a seal on either side of a joint such as illustrated in FIG. 3. The sealing device 20 is formed by two components: an outer sealing member 22 and an inner retainer member 24.

The outer sealing member 22 is made of an elastic material, such as rubber, in the form of a band configuration and has a cylindrical body portion 26 on which are integrally formed a pair of annular ridges 28 adjacent to its opposite ends. In the unstretched condition, the outer diameter dimension of the sealing member 22 is substantially less than the inside diameter of the pipe to be sealed so that the sealing member 22 can be easily pushed through the inside of the pipe. The cylindrical body portion 26 of the sealing member 22 is formed of a thin-wall cylindrical elastic material which is stretchable to the inside diameter of the pipe to be sealed. The pair of annular ridges 28 have an inverted V-shape constructed of a solid elastic material (FIG. 4) and are spaced apart in a lengthwise direction along the cylindrical body 26 a sufficient distance to engage the inside surfaces of adjoining pipe sections 30, 32 (see FIG. 3) adjacent their abutting ends at 34.

The inner retainer member 24 of the sealing device 20 is fabricated from an elongated strip of pliable material, such as rolled steel, that is rolled into a split sleeve configuration with its opposite ends 36, 38 in an overlapping relationship. Prior to installation, the split sleeve 37 is coiled to a sufficiently small size to fit inside the cylindrical body 26 of outer sealing member 22. After the sealing device 20 is positioned inside a gas main and centered with respect to a pipe joint 34 (see FIG. 3), an expander mechanism, such as the one to be described in full detail in the above identified copending application, pushes radially outwardly against the split sleeve 37 until the outer sealing member 22 is pressed into sealing engagement with the inside of the adjacent pipe sections 30, 32 as depicted in FIG. 3.

To hold the retainer member 24 in this sealing position, the end 36 (FIGS. 1-2) of the split sleeve 37 is provided with a locking means 40 comprising an overhanging lip portion 42 extending away from and beyond the end 36. To accommodate a range of pipe diameters, the locking means is provided with two separate locking positions. The inner locking position is formed by a center segment 44 extending from the end 36 and a pair of end segments 46 integrally formed with the end 36 and bent upwardly and away from the center segment 44 to define a first locking groove 48 therebetween. The second locking position is defined by the pair of end segments 46 and an elongated rectangular strip 50 having a thickened portion at its opposite ends 52 welded to the top surface of the pair of end segments 46, forming a second locking groove 54 therebetween.

It is of course necessary that the material selected for the retainer member 24 be of sufficient rigidity and strength to hold the sealing member 22 in the sealed position. It has been found that a sleeve fabricated from 20-gauge hot-rolled steel performs this function quite satisfactorily. To strengthen the ends 36, 38 of the split sleeve 37, a number of stiffening ribs 58 and 60 are provided.

A suitable tool for installing one of the sealing devices 20 at a pipe joint inside a gas main is illustrated in FIGS. 6a – 6b and generally designated by the reference numeral 100. Seal installation tool 100 is shown disposed inside a gas main having pipe sections 30 and 32. The installation tool 100 has a generally elongated tubular structure whose overall diameter is sufficiently less than the diameter of pipe sections 30, 32 to permit it to be readily pulled through the gas main in either direction.

The seal installation tool 100 comprises a cable connector assembly 102, a leak detector assembly 104, a front centering assembly 106, a seal magazine assembly 108, a seal expander assembly 110, and a rear centering assembly 112. The details and cooperation of these various assemblies will be described hereinafter.

To move the seal installation tool 100 through the gas main in either direction, it is provided with front and rear eye-hook couplers 114 and 116, to which are fastened pull cables extending in opposite directions away from the seal installation tool 100.

Before the seal installation tool 100 can be used, it is necessary to first remove a section of the gas main from service and open up a hole at both ends of this section. The seal installation tool 100 is inserted into one end of this opened section of main. Two cables coupled to the front and rear eye-hook couplers 114 and 116 extend through the gas main section to hand-cranked wheels located at the two work holes for moving the installation tool 100 in either direction through the gas main section.

In order to install a seal device 20 at a number of joints along the gas main section, the seal magazine assembly 108 carries a plurality of these seal devices and includes feed means for selectively advancing them to the seal expander assembly 110. The feeding operations and seal expander operations are controlled at a control panel located above ground.

It is to be understood that other tools can be used to apply sealing device 20 and installation tool 100 is illustrated for exemplary purposes only. A detailed description of the construction and operation of installation tool reference is disclosed in our above-identified copending application.

We claim:

1. Sealing device for sealing a joint between aligned adjacent pipe ends comprising a resilient tubular outer sealing member of an external diameter less than the internal diameter of the adjacent pipe ends and being adapted to lie inside the pipe ends and to bridge the gap between them, a relatively stiff resilient inner retainer member inserted into the sealing member, said inner retainer member being a tubular sleeve slitted longitudinally and having the margins along the slit overlapping whereby the external diameter of the unexpanded tubular sleeve member is less than the internal diameter of said unexpanded outer sealing member, said inner retainer member having longitudinally extending shoulder means which are brought into interlocking position by expansion of the sleeve against the inside surface of said outer sealing member to hold said outer sealing member under radial pressure against adjacent pipe ends to seal the same, said resilient tubular outer sealing member having sufficient radial displaceability to permit the expansion of said retainer member to the extend of bringing the shoulders into interlocking position and thereafter retaining sufficient compression against the engaged pipe ends to seal the same.

2. The combination of claim 1, wherein said sealing member has a pair of annular ridges spaced apart in a lengthwise direction a sufficient distance to engage the inside surface of adjoining pipe sections on opposite sides of a pipe joint.

3. The combination of claim 1, wherein said longitudinally extending shoulder means define at least two locking positions to accommodate different internal pipe diameter sizes.

4. Apparatus for sealing leaks in pipes comprising a sealing device having an outer sealing member and an inner retainer member, said outer sealing member constructed of elastic material in the form of a band which is stretchable to a sealing engagement position with the inside surface of a pipe, said inner retainer member constructed in the form of a radially expandable split sleeve having overlapping ends and having sufficient rigidity to press said sealing member into sealing engagement with the pipe, and said retainer member including locking means for holding said sealing member into said sealing engagement position, whereby the sealing device is pushed inside the pipe to the leak location and thereafter said retainer member is expanded radially until said sealing member is pressed in sealing engagement with the inside of the pipe which is maintained by said locking means.

5. The combination of claim 4, wherein said sealing member has a pair of annular ridges spaced-apart in a lengthwise direction a sufficient distance to engage the inside surface of adjoining pipe sections on opposite sides of a pipe joint.

6. The combination of claim 4, wherein said locking means of said retainer member has at least two locking positions to accommodate different internal pipe diameter sizes.

7. The combination of claim 4, wherein said split sleeve of said retainer member has a first end in an overlapping arrangement with a second end in the unexpanded position and said locking means including an overhanging lip portion secured to one of said first and second ends and extending forwardly in a spaced-apart relation with said one of said first and second ends to define therebetween a locking groove for the other of said first and second ends.

* * * * *